United States Patent [19]
Cotton et al.

[11] Patent Number: 6,092,007
[45] Date of Patent: Jul. 18, 2000

[54] AIRCRAFT COURSE CORRECTION FOR WIND AND FUZZY LOGIC COURSE INTERCEPT PROFILE BASED UPON ACCURACY AND EFFICIENCY

[75] Inventors: Bryan S. Cotton, Monroe; Christopher A. Thornberg, Newtown, both of Conn.; David M. Walsh, Palm City, Fla.; Sherman Corning, III, Monroe, Conn.

[73] Assignee: Sikorsky Aircraft Corporation, Stratford, Conn.

[21] Appl. No.: 09/069,666

[22] Filed: Apr. 29, 1998

[51] Int. Cl.[7] .................................................. G05D 1/00
[52] U.S. Cl. .............................. 701/4; 701/210; 701/224; 701/302; 244/76 R; 244/158 R; 244/181
[58] Field of Search .............................. 701/4, 1, 13, 14, 701/15, 16, 23, 202, 205, 206, 210, 224, 302; 244/76 R, 17.13, 96, 181, 158 R

[56] References Cited

U.S. PATENT DOCUMENTS

| | | | |
|---|---|---|---|
| 3,927,306 | 12/1975 | Miller | 701/15 |
| 4,354,240 | 10/1982 | Olive | 701/4 |
| 4,383,299 | 5/1983 | Fischer et al. | 701/4 |
| 5,058,824 | 10/1991 | Cycon et al. | 244/171.3 |
| 5,150,857 | 9/1992 | Moffitt et al. | 244/12.2 |
| 5,375,794 | 12/1994 | Bleeg | 701/4 |
| 5,429,089 | 7/1995 | Thornberg et al. | 123/352 |
| 5,552,983 | 9/1996 | Thornberg et al. | 701/23 |
| 5,615,118 | 3/1997 | Frank | 701/4 |
| 5,676,334 | 10/1997 | Cotton et al. | 244/17.13 |
| 5,797,106 | 8/1998 | Murray et al. | 701/11 |

*Primary Examiner*—William A. Cuchlinski, Jr.
*Assistant Examiner*—Gertrude Arthur
*Attorney, Agent, or Firm*—M. P. Williams

[57] ABSTRACT

An aircraft autopilot system provides a wind correction angle which is added to the desired course to provide commanded heading, the wind correction angle being generated as a proportional and integral function of ground track error. When the aircraft is off its desired course, it can be returned to the desired course by means of a course intercept angle, added to the desired course, to provide a corrected commanded course, the course intercept angle being a proportional function of the perpendicular error (the lateral distance of the aircraft from the original course) suitably limited to some angle within 90° of the desired course. The course correction angle may be generated as a proportion of the perpendicular course error determined by the degree of importance of accuracy, and may be switched over to a course directly toward a waypoint in dependence upon the importance of efficiency. The course intercept angle may be a variable proportion of the perpendicular error as a function of the importance of accuracy, and the limits on the intercept angle determined by the relative importance of efficiency.

7 Claims, 5 Drawing Sheets

6,092,007

AIRCRAFT COURSE CORRECTION FOR WIND AND FUZZY LOGIC COURSE INTERCEPT PROFILE BASED UPON ACCURACY AND EFFICIENCY

TECHNICAL FIELD

This invention relates to aircraft automatic flight control systems in which ground track is utilized to correct for wind and in which course errors are corrected efficiently by flying straight toward a waypoint, or with great accuracy by resuming the original course directly (such as to avoid obstacles when flying low), or by some inbetween mix of the two, determined by fuzzy logic.

BACKGROUND ART

The navigational problems which are solved by the present invention, as well as the invention itself, are applicable to all aircraft, are particularly useful in rotary wing aircraft, and are described as they might be implemented in an unmanned rotary wing aircraft.

Typical navigation may utilize courses established to lead an aircraft from one waypoint (such as a VOR navigation beacon) to the next waypoint. Most aircraft autopilot systems use the course deviation to the next station to adjust yaw through a proportional and integral path. If the aircraft is on course, but the wind is blowing it off course, no corrective action will be taken until there is a sufficient error. Thus, the aircraft will fly in a path more characterized as a saw tooth than in a straight line.

When an aircraft is significantly off-course, its heading can be changed so as to cause it to point directly toward the next waypoint, thereby reaching the next waypoint in the most efficient manner. However, the consequences of flying to the waypoint from a different origin with a different heading may be unknown. For instance, there may be significant obstacles which are best avoided by flying along the originally-planned course. Thus, accuracy in following substantially the originally-planned course may be paramount. Thus, when off-course, it may be necessary to return to the original course and assume the original heading.

DISCLOSURE OF INVENTION

Objects of the invention include improved correction of heading for the effects of wind; an automatic flight control system which anticipates the effects of wind and accommodates them continuously; automatic flight control in which the heading is automatically corrected for wind effects; automatic flight control in which off-track errors can be corrected by returning to the original track, or nearly so, and resuming substantially the originally-intended heading; an automatic navigation system which can correct off-track errors with a smooth intercept of original heading; and an automatic navigation system which can correct off-track errors with maximal efficiency, maximal accuracy, or variable amounts of either. A first aspect of the present invention is predicated on separating the correction of heading as a consequence of wind from other heading errors, and is also predicated in part on the use of the ground track for the navigation of the aircraft.

Another aspect of the present invention is predicated on the use of a global positioning system based inertial navigation system to provide the perpendicular distance from a desired flight path.

According to the present invention, the ground track of the aircraft, defined as the arctangent of the ratio of eastward groundspeed divided by the northward groundspeed, corrected for the quadrant of the ratio, is compared with the commanded course to provide a ground track error which, after proportional and integral processing, provides a wind correction angle which can be added to the commanded heading to cause the aircraft to fly along the desired course, fully compensated for the wind.

According to the invention, the perpendicular error of the aircraft off its desired course is utilized to provide a heading correction proportional to error so as to cause the aircraft to fly back to and resume the desired course, with a smooth transition of aircraft heading (which may be as much as 90° off the desired course when correction of the error is commenced) to the desired heading toward the next waypoint.

According to the invention further, the manner of correcting a course error to either achieve accuracy or efficiency can be determined by establishing indications of the importance of accuracy and indications of the importance of efficiency, and utilizing the established indications of accuracy and efficiency to fly a course which combines heading which is proportional to perpendicular error and heading which is directed toward the waypoint. According further to the invention, the importance of efficiency can be utilized to determine a point, along the correction of course error, when control can shift from the accurate control of heading as a function of error and the efficient control of heading directly at the waypoint. In still further accord with the invention, the importance of efficiency can be utilized to adjust the intercept angle limits imposed upon intercept angles generated as a function of the importance of accuracy.

The present invention may be implemented with analog circuitry, and in fact is described in functional block form, but the invention is preferably implemented in a suitably programmed flight control computer, having functional capability similar to any suitable popular personal computer, utilizing mathematical algorithms and other subroutines which are well known in the art.

Other objects, features and advantages of the present invention will become more apparent in the light of the following detailed description of exemplary embodiments thereof, as illustrated in the accompanying drawing.

BEST MODE FOR CARRYING OUT THE INVENTION

The present invention is described as it would apply to an unmanned aerial vehicle of the type generally referred to in commonly owned U.S. Pat. Nos. 5,058,824, 5,150,857, 5,429,089, 5,552,983, and 5,676,334, all of which are incorporated herein by reference. That vehicle is generally toroidal in shape, having counterrotating, variable-pitch blade rotors, coaxially driven within the center of the toroid.

Figure 1:
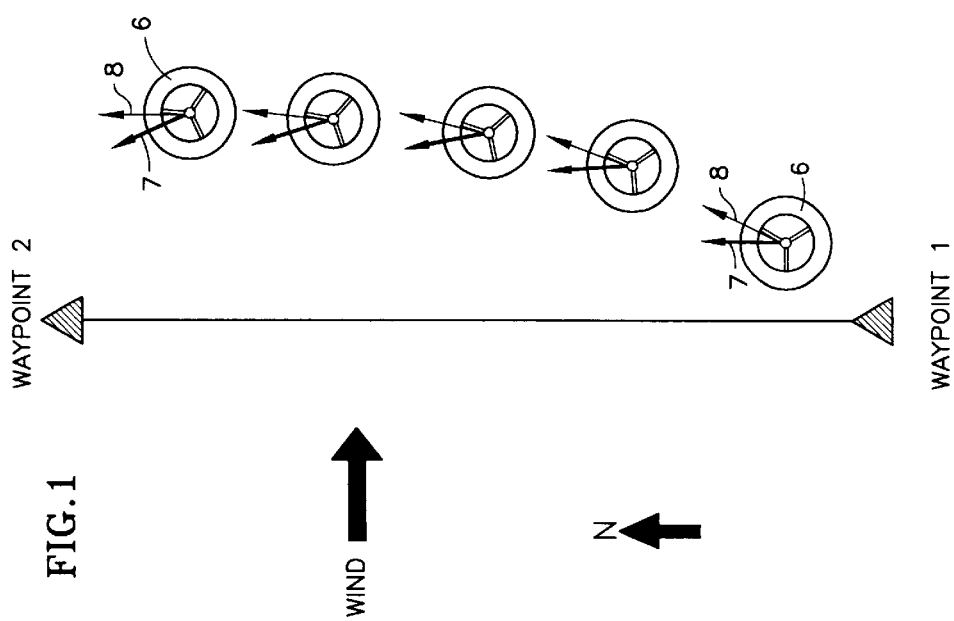
FIG. 1 is an illustration of heading correction being made to accommodate wind.

In a conventional autopilot, if an aircraft is on course, but is being blown off-course, no corrective action will be taken until there is a sufficient error to indicate being off-course. What is necessary is a system that acts more like a skilled pilot, who can determine if his aircraft is being blown off-course simply by observation. Upon detecting the wind condition, the pilot will correct the aircraft heading so as to compensate for the wind. This type of corrective action is illustrated in FIG. 1. Initially, near waypoint 1, the aircraft 6 has a northerly heading 7, but a northeasterly ground track 8. The invention will gradually add in a wind correction angle until the heading 7 (top of FIG. 1) is northwesterly and the ground track is due north.

According to the invention, correction for the wind is provided by utilizing the aircraft ground track, which is defined as the arctangent of the ratio of eastward groundspeed divided by northward groundspeed, corrected for the quadrant of the ratio. This provides an angle between 0 and 360° which indicates the actual direction of flight. Any slight deviation from the desired flight path will have an immediate, corrective effect.

Figure 2:
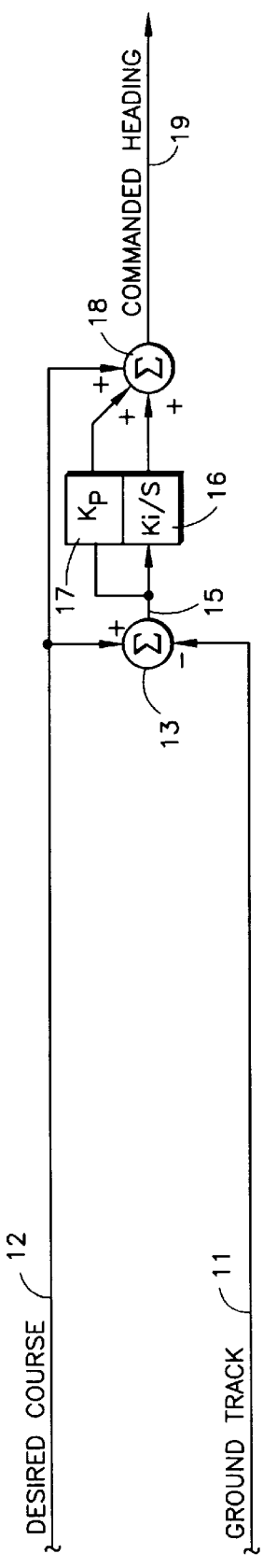
FIG. 2 is a functional block diagram of wind compensation, in accordance with the present invention.

Referring to FIG. 2, a ground track angle on line 11 is subtracted from the desired course on line 12 in a summer 13. The result on line 15 is passed through integral and proportional processing 16, 17, the outputs of which are summed together to provide a wind correction angle, and that is summed with the desired course, in a summer 18, to provide a commanded heading on a line 19, which can be applied to the heading hold channel of the auto pilot. This is a first aspect of the present invention.

For a number of reasons, such as obstacle avoidance or operator intervention of some sort, an aircraft may find itself off-course. Utilizing modern global positioning system based inertial navigation systems, the aircraft not only realizes it has a bearing error to a waypoint, which may be identified by a navigation station such as the well-known VOR stations, but it is also capable of calculating the perpendicular distance away from the desired flight path. Of course, the most efficient way to reach a waypoint, thereby covering the least distance and spending the least amount of time traveling, is to cause the aircraft to head directly toward the waypoint. This is referred to herein as the efficiency method. On the other hand, it may be necessary to return to the original course so as to avoid obstacles, detection by unfriendly forces, and the like. In such a case, a rapid return to the original flight path can be made by flying directly toward the flight path, inherently at right angles to the original course. However, it is preferred not to have the heading change abruptly by 90° when the original course is intercepted (which would be difficult to achieve in any case), but rather to have a gradual intercept with the original course. According to the invention, this can be achieved by defining a course intercept angle as proportional to the perpendicular distance to the desired flight path, and limiting that angle to plus or minus 90° (or some lesser angle). The intercept angle is summed into the desired course so that a smooth interception of the flight path is made.

Figure 3:
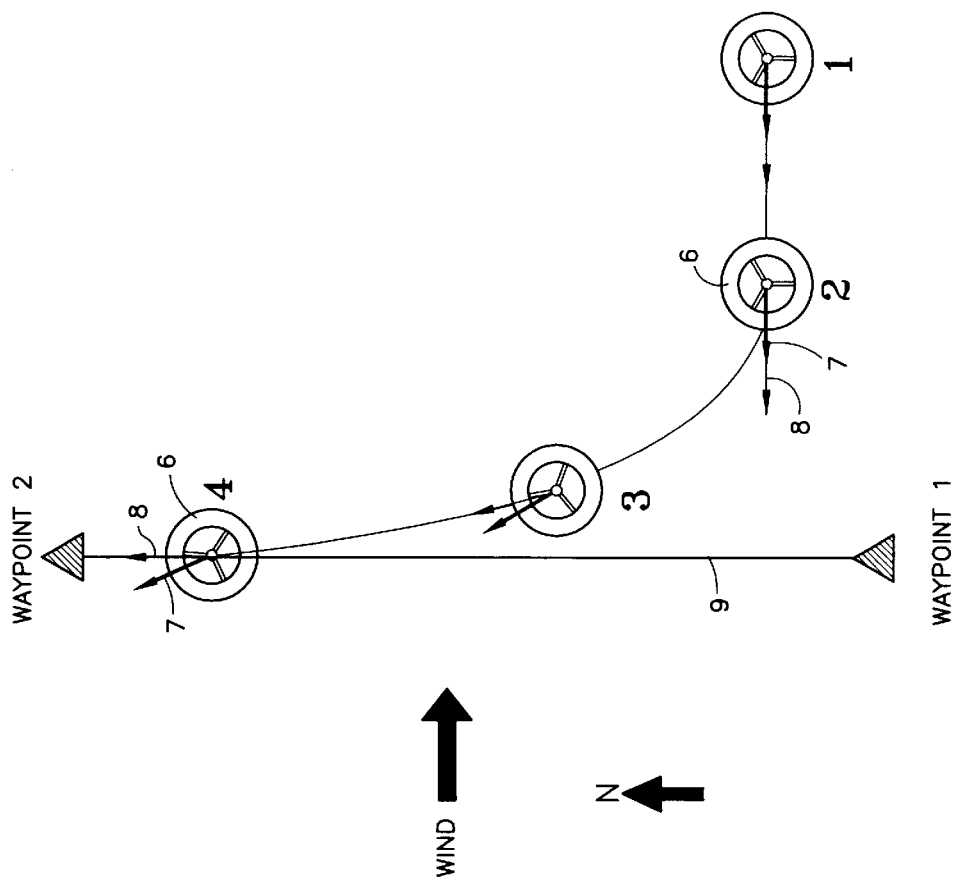
FIG. 3 is an illustration of high accuracy correction of a severe course error, in accordance with the invention.

In FIG. 3, the aircraft initially is at position 1, and is sufficiently far away such that the proportionality exceeds 90°, so it flies on 90° limits straight toward the original desired course 9 until it reaches position 2. At position 2, the defined intercept begins to be less than 90°, so that as the aircraft flies closer to the original course, between position 2 and position 3, its ground track heading gradually approaches that of the original course, which it achieves by the time it reaches position 4 in FIG. 3. Note the wind correction angle of FIGS. 1 and 2 causes the heading 7 to be northwesterly while the ground track 8 is northerly (at position 4).

Figure 4:
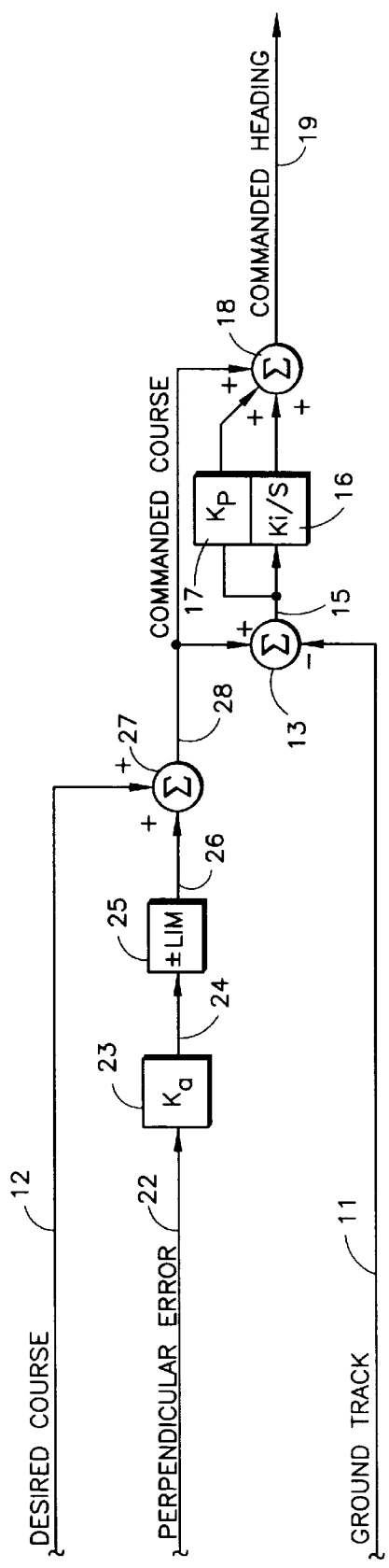
FIG. 4 is a functional block diagram of apparatus for performing a high accuracy course correction of the type illustrated in FIG. 3, in accordance with the invention.

Referring to FIG. 4, the course correction illustrated in FIG. 3 utilizes the perpendicular error on the line 22, scaled in a proportional function 23 to provide a signal on a line 24 which is equal to 90° when the aircraft reaches point 2 of FIG. 3, that is a distance from the original flight path at which the intercept angle will begin to approach that of the original course. A limiter 25 limits the signal on line 24 so as to provide a course intercept angle signal on a line 26 which is no greater than 90°, flying directly toward the original course. Of course, lesser limits could be utilized if desired, but resumption of the original course would not be achieved as quickly. The course intercept angle on line 26 is summed into the desired course by a summer 27 so as to provide a commanded course on a line 28, which is processed in the same fashion as the desired course in the apparatus of FIG. 2. This will have wind correction subtracted from it (as in FIG. 2) to accommodate course errors caused by the wind, the summer 18 providing the commanded heading on the line 19, as described hereinbefore.

Figure 5:
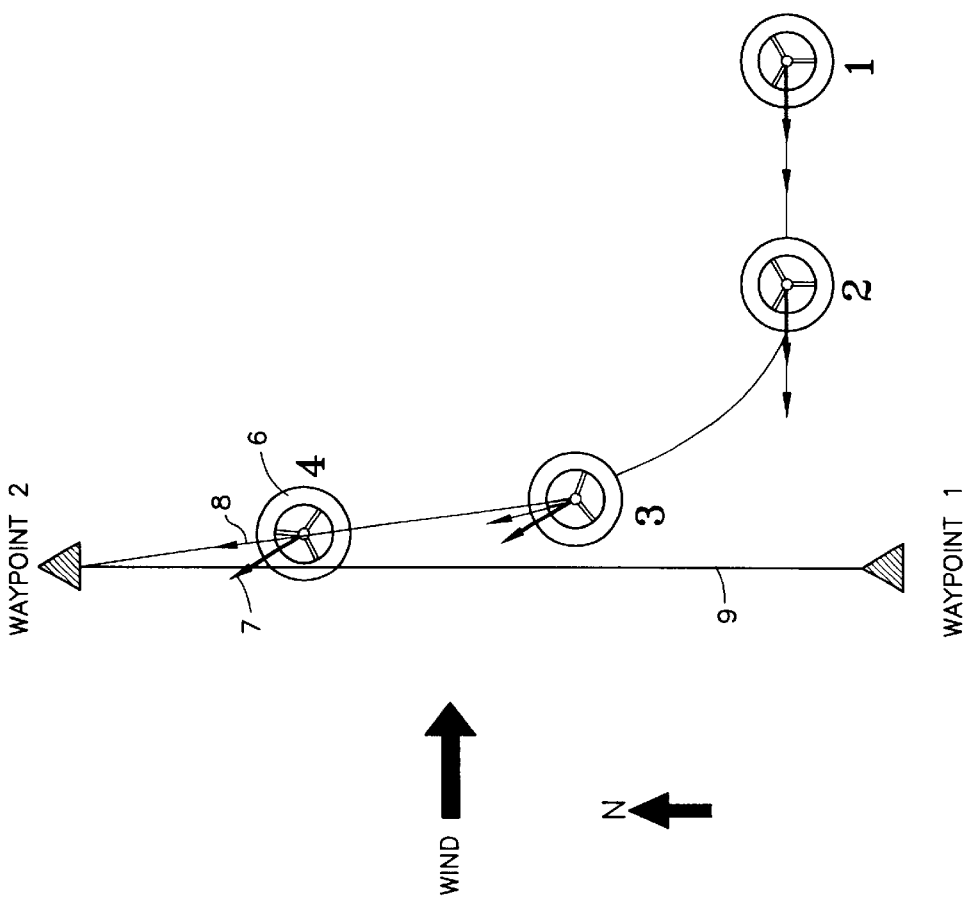
FIG. 5 is an illustration of a combination of an accurate method of correcting a severe course error combined with an efficient method of correcting a course error, in accordance with the invention.

In accordance with the invention, correction of a bad course error can be achieved with a combination of the accurate method which returns the aircraft to the original course toward the waypoint, as illustrated in FIG. 3 and achieved in FIG. 4, along with the efficient method which will fly the aircraft directly toward the waypoint, whenever it is feasible to do so. This sort of course recovery is illustrated in FIG. 5 in which the aircraft will fly directly toward the original course on the 90° limits between points 1 and point 2, then will fly a course in which the intercept angle is proportional to the remaining perpendicular distance to the original course, between points 2 and 3, and at point 3, the perpendicular error becomes small enough so that the aircraft can now assume a heading directly toward the waypoint which it does as it flies from point 3 through point 4 to the waypoint. Not only can both the accurate and efficient methods be used, but the degree of proportionality (between point 2 and point 3 in FIG. 5), and therefore the shape of the course intercept path, as well as the position of point 3 (that is, the perpendicular distance from the original course at which a changeover to the efficient method). This control is effected in accordance with the invention by a simple form of fuzzy logic.

Figure 6:
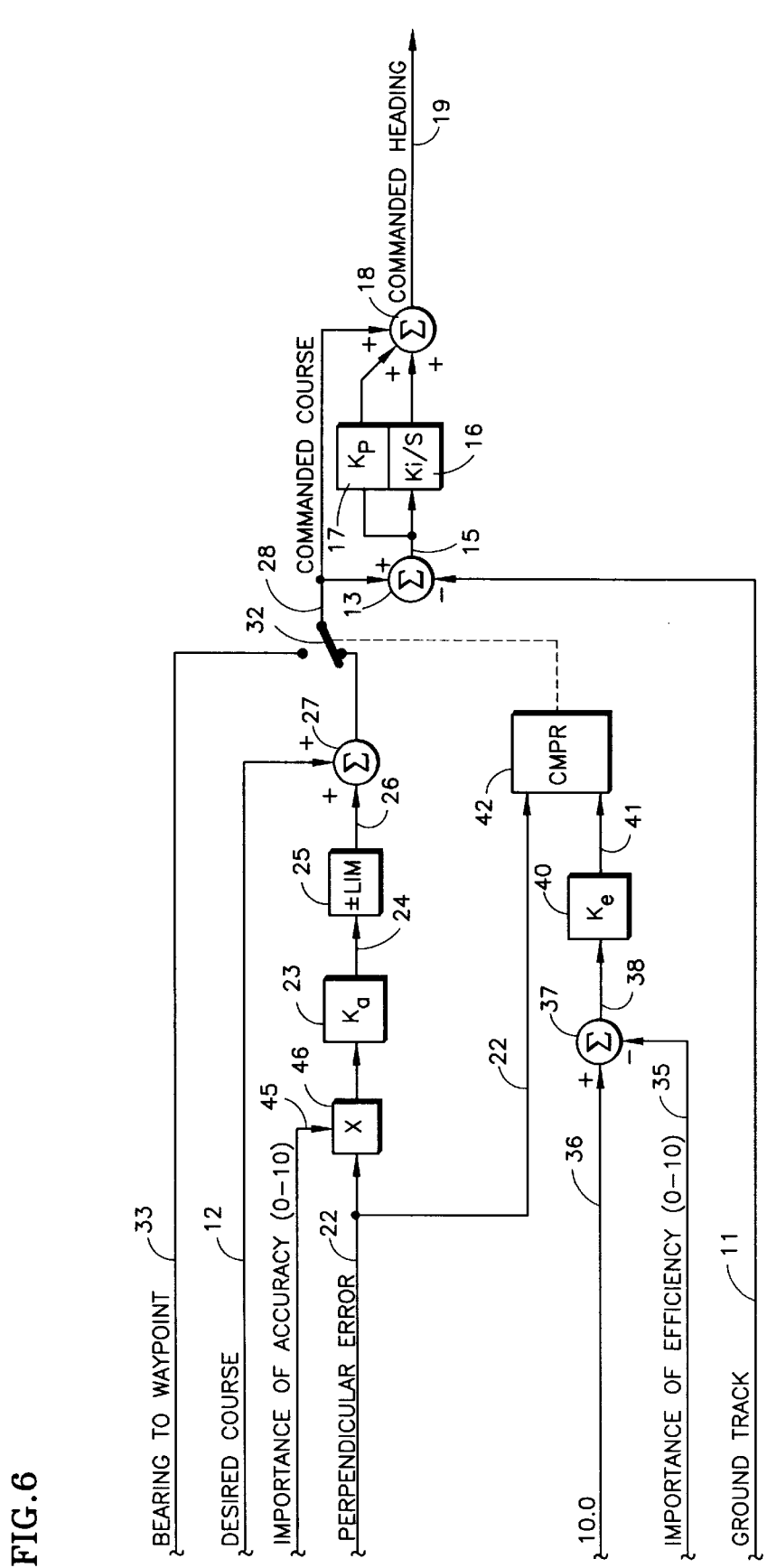
FIG. 6 is a functional block diagram of apparatus for performing combined accurate and efficient course correction, of the type illustrated in FIG. 5, according to the present invention.

Referring to FIG. 6, a switch 32, when in the position shown, allows the commanded course on line 28 to be a limited function of the perpendicular error, in the same fashion as described with respect to FIG. 4. On the other hand, if the switch 32 is placed in the opposite position from that shown, the commanded course will be derived from the bearing to the waypoint on a line 33, which is the most efficient method of reaching the waypoint. According to the invention, the importance of efficiency, which is represented by a number between 0 and 10 in the present embodiment, is indicated on a line 35, in response to the setting of a linear or rotary potentiometer or other device by a pilot or other operator. This is converted in a summer to a range of importance of between 10 and 0 by virtue of subtraction from a value of 10 on a line 36 in a summer 37. Thus, if efficiency is paramount, the number on a line 38 may be near 0, whereas if efficiency is totally unimportant, the number on the line 38 may be close to 10. This number is multiplied by a constant, in an amplification function 40, such as will provide a range of values on a line 41 that will relate to a variety of perpendicular distances, below which a comparator 42 will cause the switch 32 to change from the position shown in FIG. 6 to the opposite position, thereby to have the aircraft fly directly toward the waypoint. Thus, in FIG. 6, the importance of efficiency determines how soon a course directly toward the waypoint can be undertaken: the more important that efficiency is, the farther away from the original course the aircraft will be when it assumes a course directly toward the waypoint; and conversely, the less important that efficiency is, the closer the aircraft will fly to the original course before assuming a course directly to the waypoint.

In FIG. 6, the invention also provides fuzzy logic control over the course intercept angle as a proportion of the perpendicular error. This is achieved by having the importance of accuracy valued between 0 and 10, in this embodiment, provided on a line 45 to a multiplier 46 so as to scale the perpendicular error in a desired fashion prior to its normal scaling in the proportional function 23 and limiting as described with respect to FIG. 4 hereinbefore. In this case, the constant of proportionality provided by the function 23 may be such that, when the importance of accuracy is very high and there is a value close to 10 on the line 45, the signal on the line 24 will be limited by the limiter 25 until the aircraft is quite close to the original course. To avoid an abrupt course change, the constants in the functions 23 and 40 should be adjusted so that there is some non-zero course correction achieved through the summer 27 prior to changing course to the bearing directly to the waypoint by means of the switch 32.

Figure 7:
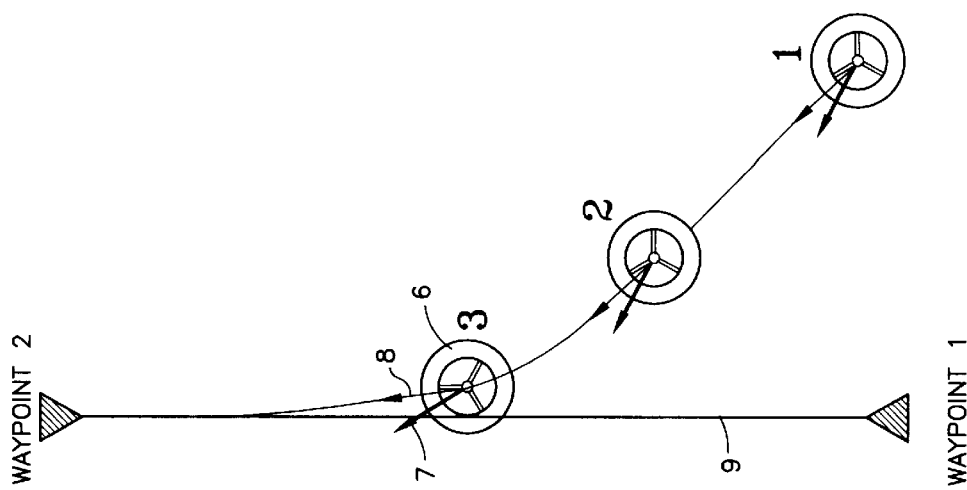
FIG. 7 is a diagram illustrating an alternative method of performing combined accurate and efficient course correction, in accordance with the invention.

Another method in which the blending of efficiency and accuracy can be achieved in determining the course intercept angle is illustrated in FIG. 7. Therein, the limit of the course intercept angle is seen as being about 45°, and it is determined by the importance of efficiency, so that the aircraft begins to fly toward the waypoint immediately, rather than flying perpendicular to the course to the waypoint. Then, when the limits are no longer exceeded, the course intercept angle will be proportional to the perpendicular course error, as described hereinbefore, the proportionality being controlled by the importance of accuracy (in the same fashion as described with respect to FIG. 6, hereinbefore).

Figure 8:
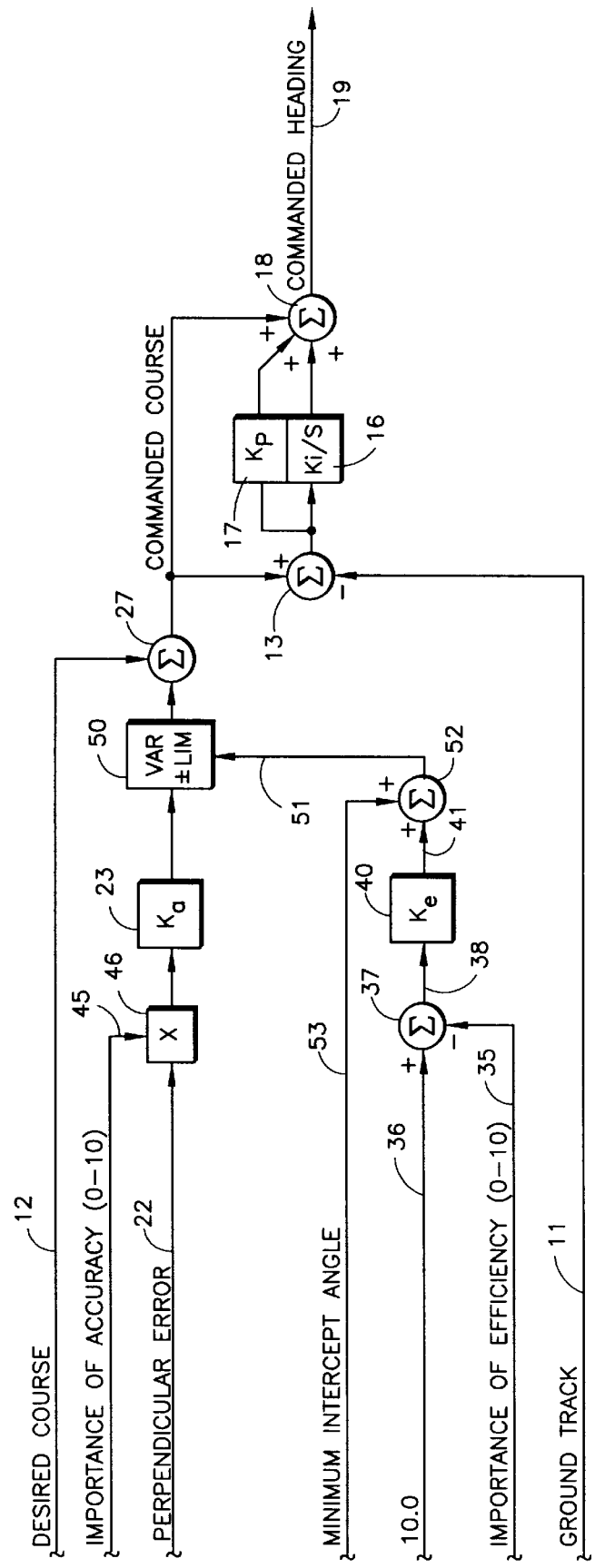
FIG. 8 is a functional block diagram of apparatus for performing a combined accurate and efficient correction of the type illustrated in FIG. 7, in accordance with the invention.

Referring to FIG. 8, the fuzzy method described with respect to FIG. 7 is achieved by means of a variable limiter 50, the limits of which are adjusted by a signal on a line 51 from a summer 52 that responds to the scaled importance of efficiency signal on the line 41 and a signal on a line 53 representing a minimum intercept angle. Thus, if efficiency is not important at all, the signal on the line 51 will set limits of plus or minus 90° in the variable limit 50. But if efficiency is very important, the signal on line 38 will be very small, and the output of the summer 52 on line 51 will represent some number of degrees less than 90°, such as the 45° illustrated in FIG. 7. If efficiency is paramount, the signal on line 38 will be minimal, so that the limits set by the signal on line 51 will depend mainly or entirely on the minimum intercept angle represented on the line 53. Thus, depending upon the perpendicular error, the aircraft could start flying with a significant component directly toward the waypoint. Of course, some minimum intercept angle is required (provided by line 53) so that the aircraft will not fly a course which is simply parallel to the original course, thereby missing the waypoint altogether.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. An automatic flight control system for an aircraft, comprising:

means for providing a desired course signal indicative of a desired course which the aircraft may fly in order to reach a waypoint;

means for providing a ground track signal as a function of the arctangent of the ratio of the group speed in one direction in each coordinates divided by the groundspeed of the aircraft in a direction in each coordinates which is normal to said one direction, corrected for the quadrant of said ratio;

means for providing a ground track error signal as the difference between said desired course and said ground track; and means for providing a commanded heading signal as a summation of said desired course signal with proportional and integral functions of said ground track error signal.

2. A system according to claim 1 further comprising:

means for providing a course intercept angle signal as a limited function of a proportion of the perpendicular distance of the aircraft from an original desired flight path to said way point; and wherein said means for providing a commanded heading signal provides it as the summation of said desired course signal, said proportional and integral functions of said track error signal, and said course intercept angle signal, whereby a smooth interception of the original desired flight path is made.

3. An automatic flight control system for an aircraft, comprising:

means for providing a desired course signal indicative of a desired course which the aircraft may fly in order to reach a waypoint;

means for providing a course intercept angle signal as a limited function of a proportion of the perpendicular distance of the aircraft from an original desired flight path to said waypoint; and means for providing, as the summation of said desired course signal and said course intercept angle signal, a commanded heading signal indicative of a course the aircraft should fly to return to the original desired flight path to the waypoint, whereby a smooth interception to the original desired flight path is made.

4. A system according to claim 3 wherein the proportion of perpendicular error is determined by a selectable setting representative of the importance of accuracy in the manner in which the aircraft flies to the waypoint.

5. A system according to claim 4 wherein said commanded course is switched, when the aircraft reaches a particular perpendicular distance from the original flight path to the waypoint, from being (a) said limited function of a proportion of the perpendicular error to being (b) the bearing to the waypoint.

6. A system according to claim 5 wherein said particular distance is selected by a selectable setting representative of the importance of efficiency in the manner in which the aircraft flies to the waypoint.

7. A system according to claim 4 wherein said limited function has the limits thereof determined as a function of a selectable setting representative of the importance of efficiency in the manner in which the aircraft flies to the waypoint.

* * * * *